United States Patent [19]
Kraus

[11] Patent Number: 4,859,129
[45] Date of Patent: Aug. 22, 1989

[54] PLASTIC HOLDING DEVICE

[75] Inventor: Willibald Kraus, Grunstadt, Fed. Rep. of Germany

[73] Assignee: TRW United Carr GmbH, Enkenbach Alsenborn, Fed. Rep. of Germany

[21] Appl. No.: 134,378

[22] Filed: Dec. 17, 1987

[30] Foreign Application Priority Data

Dec. 23, 1986 [DE] Fed. Rep. of Germany ....... 3644334

[51] Int. Cl.$^4$ ............................................. F16B 21/07
[52] U.S. Cl. ....................................... 411/512; 24/662; 248/68.1; 411/908; 411/918
[58] Field of Search ................. 411/512, 908, 508–510, 411/918, 437, 301; 24/662, 108, 453; 248/68.1, 74.1

[56] References Cited

U.S. PATENT DOCUMENTS

| | | | |
|---|---|---|---|
| 1,069,451 | 8/1913 | Marston | 411/437 |
| 3,910,156 | 10/1975 | Soltysik | 411/918 X |
| 4,299,520 | 11/1981 | Iwata | 411/437 |
| 4,435,111 | 3/1984 | Mizusawa | 411/437 |
| 4,518,297 | 5/1985 | Kraus | 411/437 |
| 4,541,602 | 9/1985 | Potzas | 248/68.1 X |
| 4,558,494 | 12/1985 | Kraus | 411/437 X |
| 4,579,493 | 4/1986 | Schaty | 411/908 X |
| 4,671,717 | 6/1987 | Fukuhara | 411/437 X |
| 4,728,236 | 3/1988 | Kraus | 411/437 |

FOREIGN PATENT DOCUMENTS

| | | |
|---|---|---|
| 1625332 | 4/1970 | Fed. Rep. of Germany . |
| 3002031 | 7/1981 | Fed. Rep. of Germany . |
| 3143775 | 5/1983 | Fed. Rep. of Germany . |
| 8303422 | 6/1983 | Fed. Rep. of Germany . |
| 3330263 | 3/1985 | Fed. Rep. of Germany . |
| 3406934 | 9/1985 | Fed. Rep. of Germany . |

Primary Examiner—Gary L. Smith
Assistant Examiner—Curtis B. Brueske
Attorney, Agent, or Firm—Fay, Sharpe, Beall, Fagan, Minnich & McKee

[57] ABSTRACT

The disclosed invention comprises a molded plastic holding device 10 having an axially extending inner space 11 to receive a profiled bolt, especially a sawtooth bolt. The inner space 11 has a plurality of guide stays OR ribs 3 distributed about its circumference and running in the axial direction to engage the bolt in the lengthwise direction. There is also arranged in the inner space 11 at a location prior to the guide stays 3, in the push-in direction A of the bolt, a profile guide zone 1 with spring finger elements 2. The profiled guide zone 1 is defined by radially resilient and deflectable corrugated shell parts (13 to 18) which carry the spring finger elements 2.

5 Claims, 1 Drawing Sheet

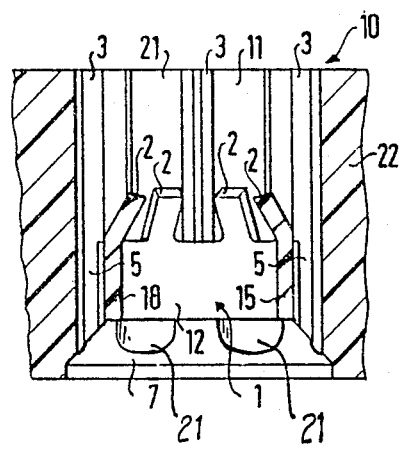
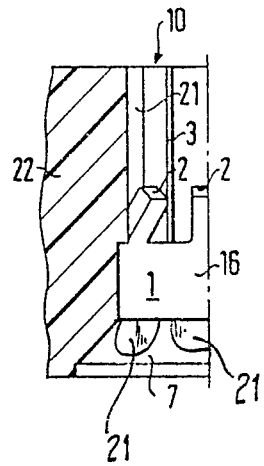
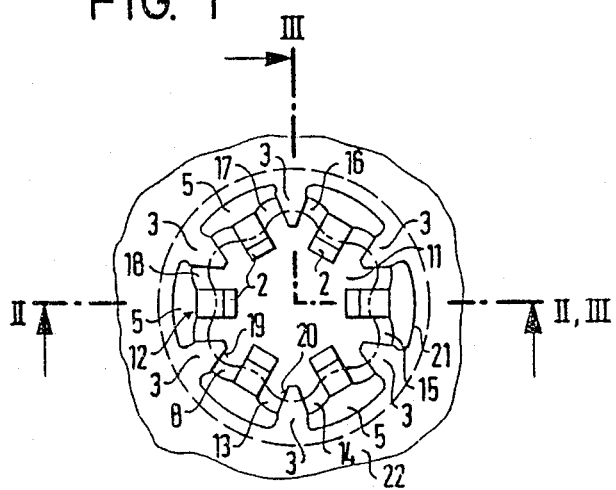

PLASTIC HOLDING DEVICE

BACKGROUND OF THE INVENTION

The subject invention relates to a plastic holding device with an inner space to receive and connect to a profiled bolt, especially a sawtooth bolt. The inner space has guide stays distributed over its circumference and running in the axial direction to engage lengthwise of the bolt.

A part having these general characteristics is already known in the prior art and is shown for example, in West German Pat. No. 3,002,031. In that patent the guide stays extend over a great part of the inner space, and are in a position to be imbedded in the profile of the bolt, especially a sawtooth bolt, and thus to hold the part to the sawtooth bolt.

It is also known in the prior art to provide over the whole length of the part at a location behind the guide stays, intermediate spaces which function to effect a certain springing action in holding the part onto a bolt. This is shown, for example, in West German Printed Disclosure 1,625,332.

It is also known to provide, in a plastic part, a kind of shell in the inner space, which is fastened by side stays to the wall of the inner space, and thus a certain spring action is exerted on a profiled bolt. See, for example, West German Printed Disclosures 3,143,775 and 3,406,934.

Also belonging to the state of the art for holding a plastic part on a profiled bolt is the providing of spring fingers, lying opposite each other and extending approximately lengthwise of the inner space (See German Utility Model 8,303,422), or arranging arched springy fingers, distributed over the circumference (See German Utility Model 3,330,263).

It is common to all these known forms that only a relatively slight holding effect is given to the profiled bolt, for example, a sawtooth bolt. Often, however, the parts, which serve, in turn, for the holding of other elements, are exposed to high alternating loads, for example, in motor vehicles, vibrations under bad road conditions, so that there is danger of an unexpected loosening.

SUMMARY OF THE INVENTION

As can be seen from the foregoing, there is a need for a holding device of the kind mentioned designed so that, with simple structure, a great improvement in the holding effect is provided and the pulling-out forces do not depend on the tolerance of the profiled bolt.

This need is satisfied according to the invention, by a holding device wherein prior to the guide stays, in the push-in direction of the bolt, there is a profiled guide zone with spring finger elements. In this way, the advantage results that in pushing the part onto the profiled bolt, the part is centered in the guide zone. With further pushing in, the spring elements located about the diameter take effect. The spring elements are placed, for example, on a common plane, such that there is always a possibility of engagement, in the sawtooth bolt threading. In the further course of pushing the part on the bolt, centering of the part is assured by the guide stays on the profiled bolt. These guide stays may be arranged on the diameter of the inner wall with at least three of the stays spaced about the circumference. In this way, the part is given an additional guiding in the upper zone.

The spring elements are placed, according to the invention, on radially resilient and deflectable shell parts, which form, in all, one corrugated shell. In this way, it is possible for the guide zone to absorb the tolerance variations of the sawtooth bolt, and the pull-out forces are no longer dependent on the tolerance. Between the shell parts and the inner wall is an intermediate space; this space assures the spring elements a clamping and exact catching into the teeth of the particular sawtooth bolt.

BRIEF DESCRIPTION OF THE INVENTION

The above and other objections and advantages will become apparent from the following description when read in conjunction with the accompanying drawing wherein:

FIG. 1 is a top view of a holding device formed in accordance with a preferred embodiment of the invention and incorporated in a plastic part.

FIG. 2 is a cross-sectional view taken along the line II—II in FIG. 1.

FIG. 3 is a cross-sectional view taken along the line III—III in FIG. 1.

FIG. 4 is a cross-side elevational view of a plastic part incorporating a holding device formed according to the invention.

DETAILED DESCRIPTION OF THE PREFERRED EMBODIMENT

Referring more particularly to the drawings wherein the showings are for the purpose of illustrating a preferred embodiment of the invention and not for the purpose of limiting the same, FIG. 4 shows a part 22 molded of plastic and having two receiving zones, 23 and 24, for receiving and holding tubing or pipelines. Between the two receiving zones, 23 and 24, is a holding or connecting device 10 formed according to the invention. The construction of the receiving zones 23, 24 are well known and form no part of the present invention and it should be understood that the holding device 10 could be incorporated in a variety of parts.

The holding device 10 is shown in more detail in FIGS. 1 to 3. Broadly the holding device comprises a relatively rigid molded plastic body having a generally cylindrical, axially extending opening or inner space 11 adapted to closely receive a profiled or sawtooth bolt or stud (not shown). Carried within the inner space 11 and extending radially thereinto are a plurality of guide stays 3 having a tapered or wedge-shaped cross-section. As best shown in FIG. 1, the stays 3 are distributed at uniform spacing about the circumference of the wall 2 of the inner space 11. In addition, as seen in FIGS. 2 and 3, the stays 3 extend in an axial direction of the space 11 and thus engage lengthwise of a bolt received in space 11.

The lower or bolt receiving end of the space 11 includes a profiled guide zone 1 provided with spring elements 2. As shown in FIGS. 2 and 3, the guide zone 1 with the spring elements 2 is located at the lower end of the guide stays 3 considering the push-in direction A of the bolt. As best seen in FIG. 1, the guide zone 1 is preferably designed as a corrugated shell 12 over the circumference of the inner space 11. In particular, the shell 12 is formed by a plurality of shell parts 13 to 18. The corrugated shell parts 13 to 18 extend between the sides of the lower extent of the guide stays 3. For example, FIG. 1 shows show the corrugated shell part 13 is fastened to the side walls 19 and 20 of the neighboring guide stays 3. In the preferred form the shell parts 13 to 18 are in each case comprised of a stay 8 with an open interface 5 provided between each stay 8 and the wall 21. This allows the shell parts 13 to 18 to be radially deflectable.

Instead of the open form with interspace 5, the possibility also exists of closing the interspace in the lower zone.

Referring to FIGS. 2 and 3, it can be seen that the spring elements 2 are carried from the upper edges of the corrugated shell parts 13–18. The spring elements 2 are designed as resilient springy fingers and are inclined inwardly toward the center of the inner space 11.

From FIGS. 2 and 3 it can also be seen that below the guide zone 1 is provided a push-in zone 7, designed in the form of a truncated cone. Now, if the part 22, shown in FIG. 4, is to be pressed onto a profiled bolt, (not shown in detail), for example a sawtooth bolt, the bolt enters from the push-in direction A. First of all, the mounting is facilitated by the push-in zone 7, designed in truncated cone form, and a centering takes place. A further centering is given by the guide zone 1, with the corrugated shell parts 13–18, the crest of the particular waves lying between the individual guide stays 3.

In the further course of pushing the part 22 onto the profiled bolt the springy fingers 2 enter into engagement with the profiles of the bolt and slide along it, until finally the front zones of the guide stays 3 cooperate with the profiles of the profiled bolt, and join the latter perfectly, in the final state of mounting with the part 22. In the final condition, the front zones of the guide stays 3 as well as the front zones of the springy fingers 2 are engaged in the corresponding profiled zones of the sawtooth bolt. This assures a perfect and secure holding which is not dislodged, even when subjected to major vibrations.

Through the special shape of the guide zone 1, the possibility exists of absorbing tolerance variations in the diameter of the sawtooth bolt, whereby the pull-out forces no longer depend on the corresponding tolerance. The interspaces 5 assure that the springy fingers 2 are able to provide a clamping and exact catching into the corresponding profile form of the sawtooth bolt.

The invention has been described with reference to a preferred embodiment. Obviously, modifications and alterations will occur to others upon the reading and understanding of this specification. It is intended to include all such modifications and alterations insofar as they come within the scope of the appended claims or the equivalents thereof.

What is claimed is:

1. A holding device for connection to a threaded bolt comprising: a relatively rigid body having an inner wall defining an opening extending inwardly of the body from an outer aperture, a plurality of guide ribs extending generally radially inwardly from the wall at circumferentially spaced locations, a profiled guide zone comprising a shell axially aligned with the opening and extending circumferentially about the interior of the opening spaced radially inwardly of said inner wall at a location axially between the outer aperture and the guide ribs, and resilient spring elements carried between the guide zone and the guide ribs, said spring elements comprising a plurality of resilient fingers extending radially and axially inwardly of said opening.

2. A holding device according to claim 1 wherein said shell has a corrugated configuration with the corrugations extending axially of the opening.

3. A holding device according to claim 1 wherein said spring elements are joined to said shell.

4. A holding device according to claim 3 wherein said shell is comprised of a plurality of shell components joined between said guide ribs and wherein said spring elements are joined to the shell components at the inner end thereof.

5. A holding device according to claim 1 wherein said shell is resilient and capable of undergoing radial deflection.

* * * * *